Sept. 15, 1970   C. A. LAUGHLIN   3,528,701
BABY CARRIER
Original Filed May 29, 1967   5 Sheets-Sheet 1
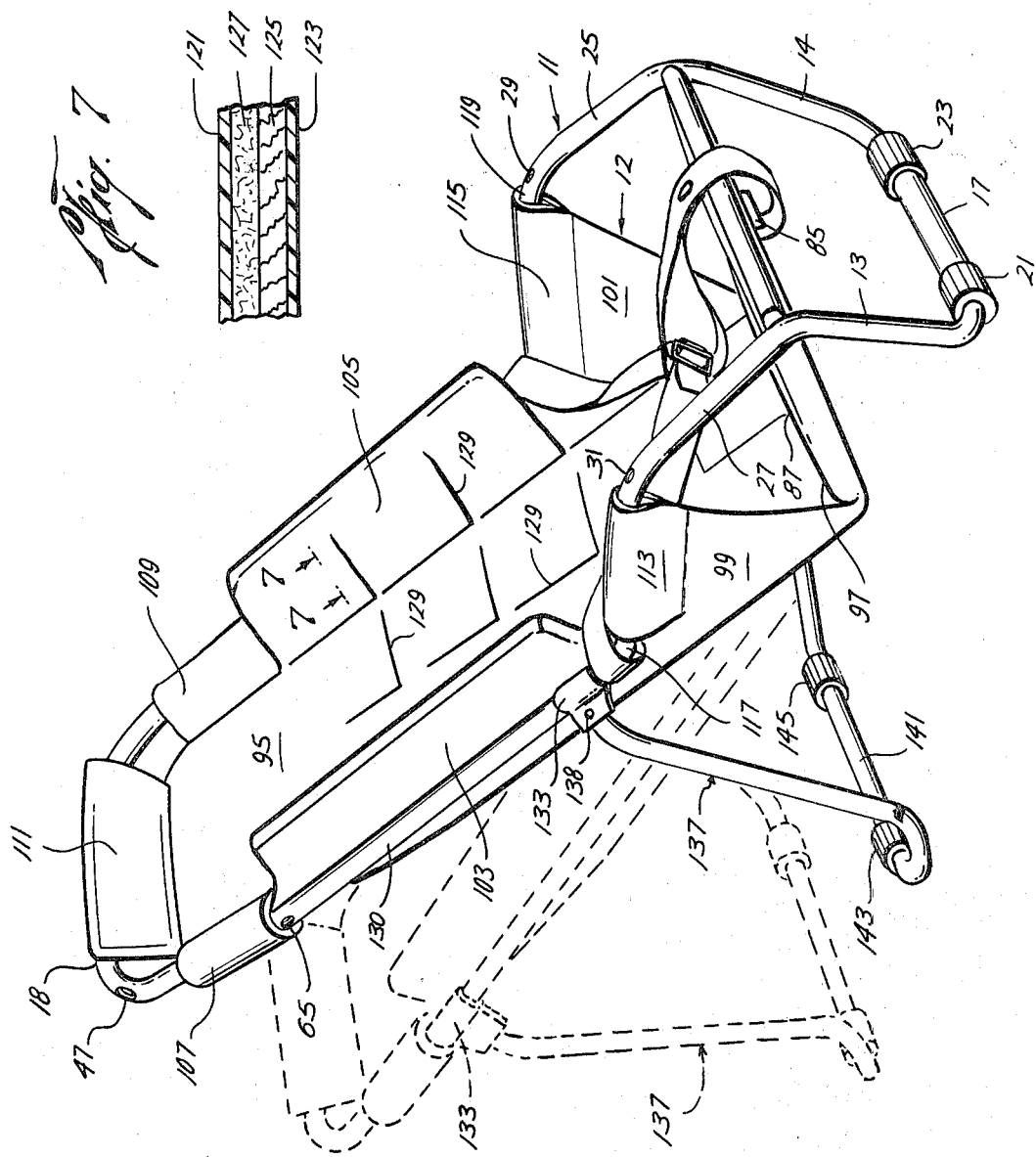
Clayton A. Laughlin
INVENTOR.
BY Murray Robinson
ATTORNEY

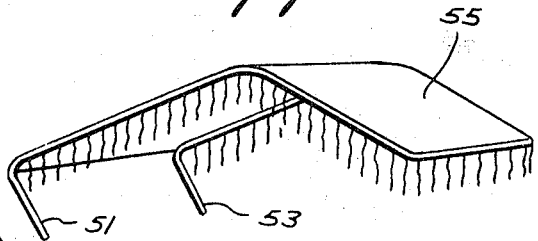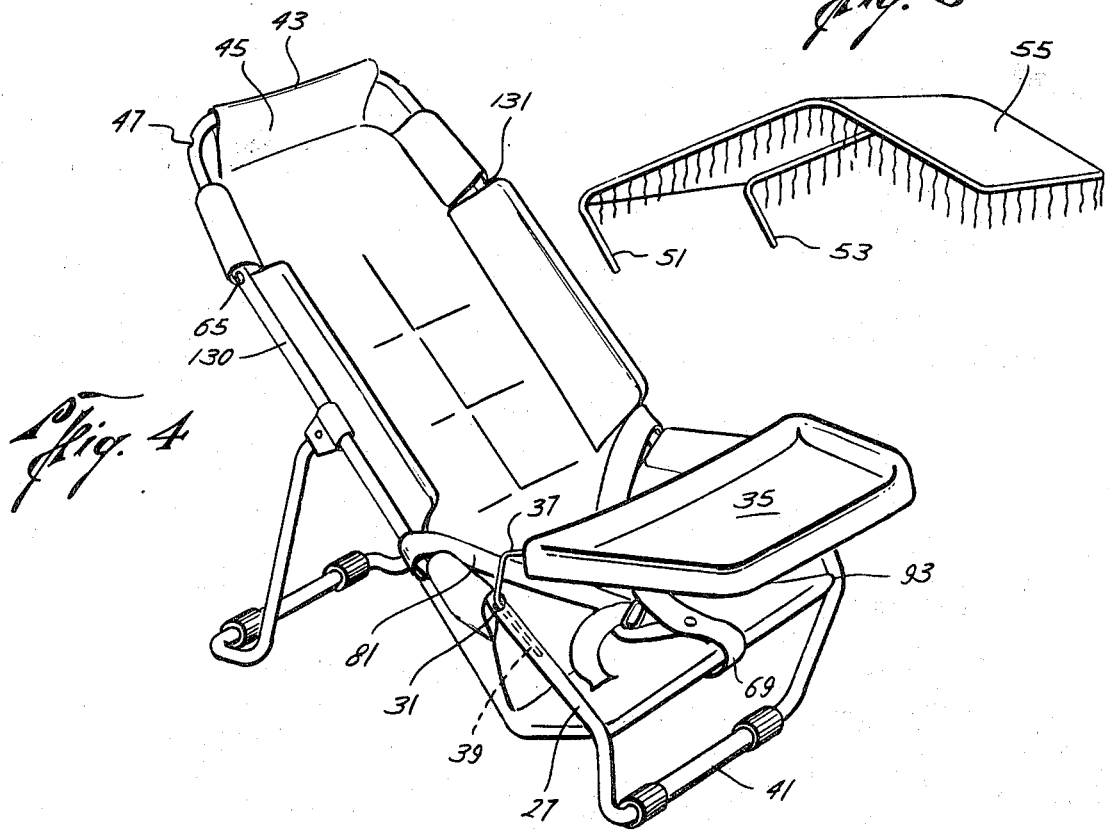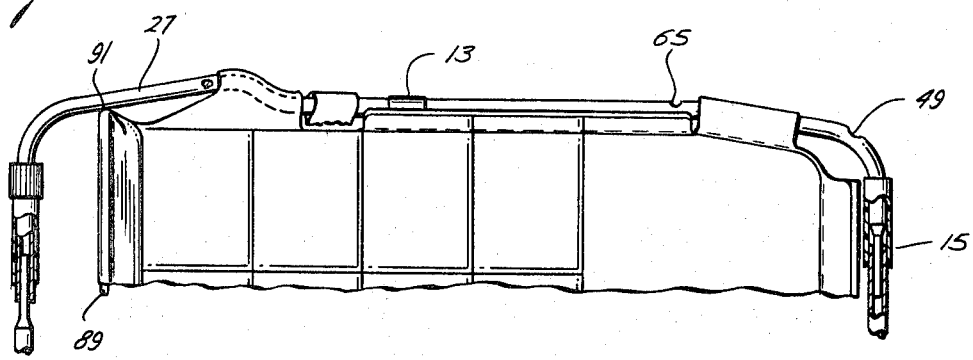

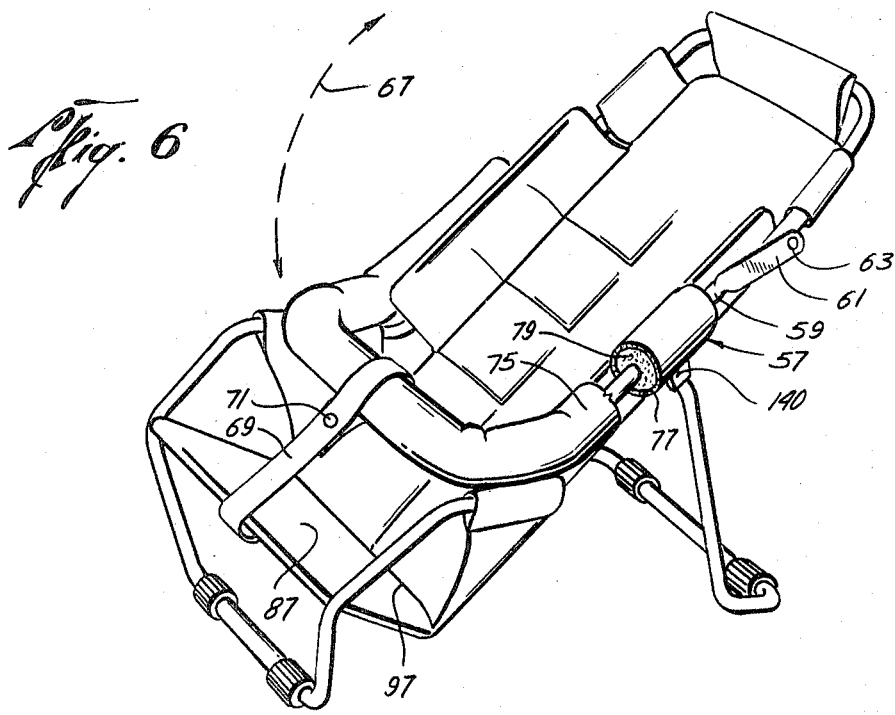
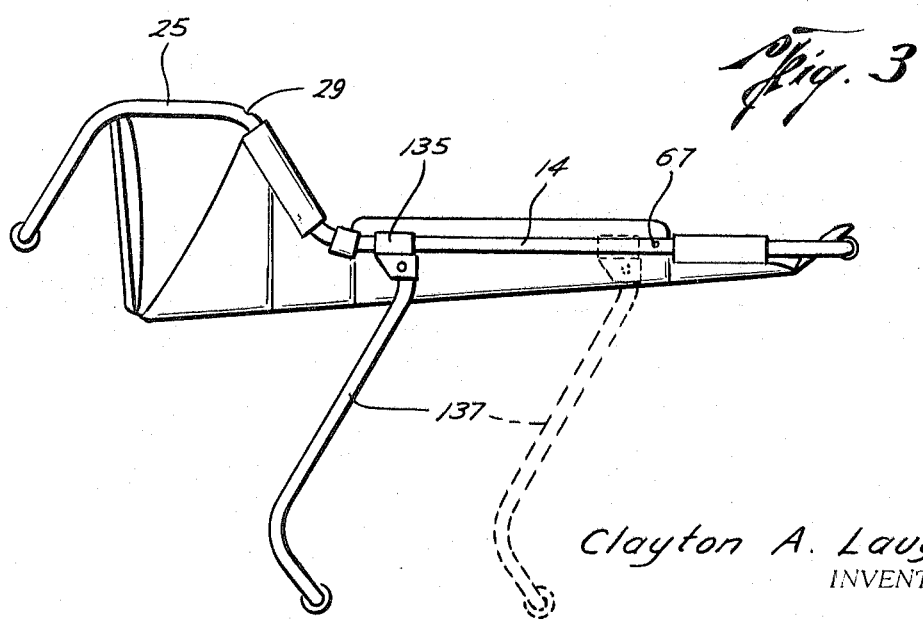

Sept. 15, 1970     C. A. LAUGHLIN     3,528,701
BABY CARRIER
Original Filed May 29, 1967     5 Sheets-Sheet 4
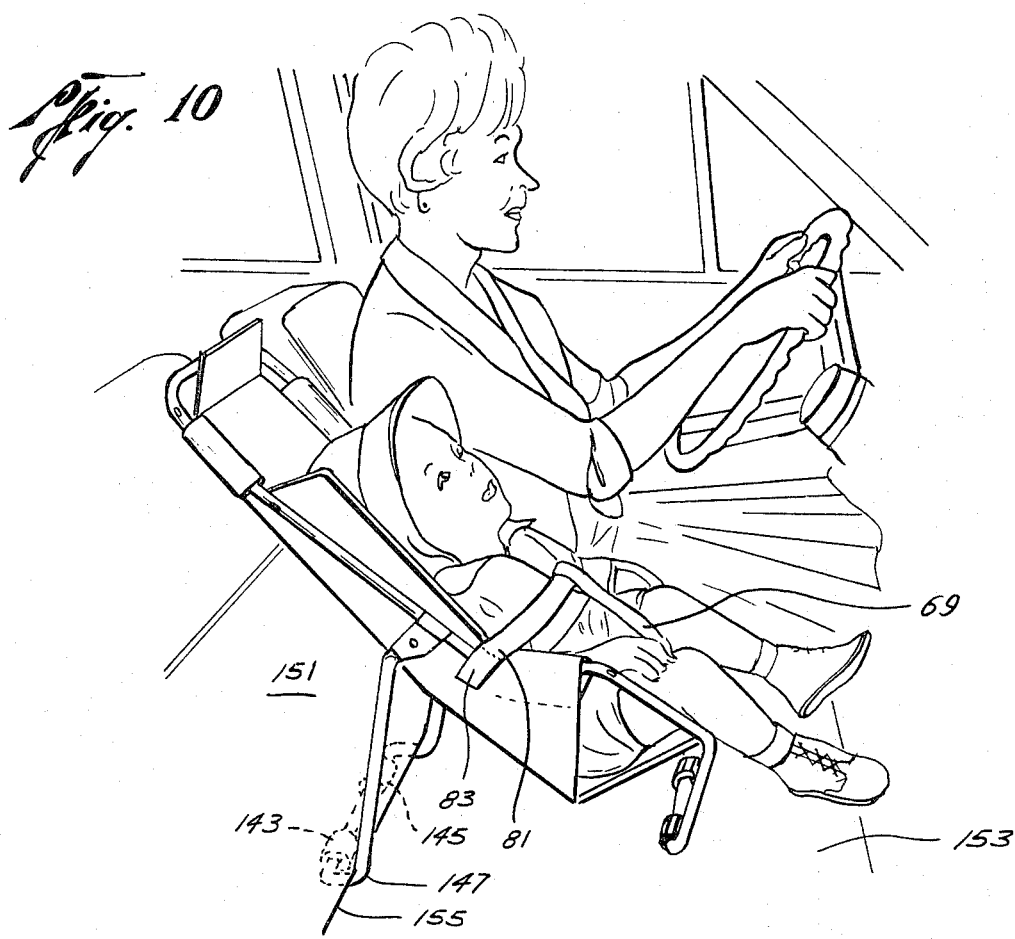
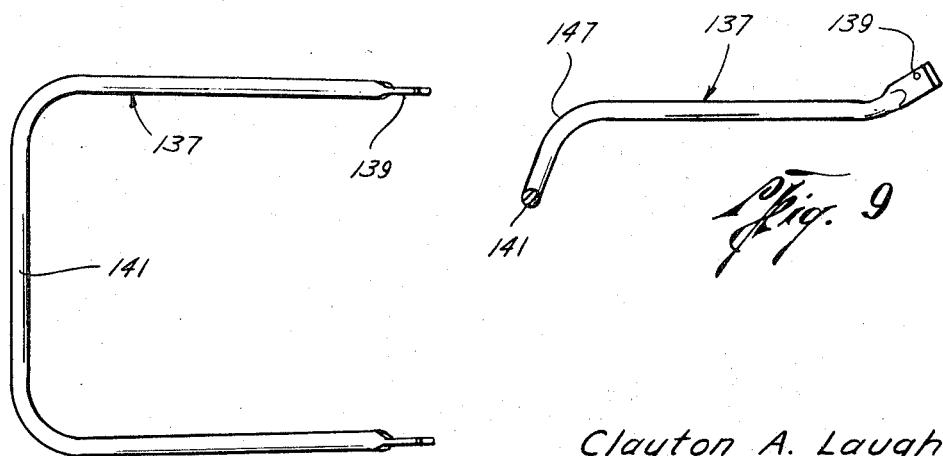
Clayton A. Laughlin
INVENTOR.
BY Murray Robinson
ATTORNEY Sept. 15, 1970      C. A. LAUGHLIN      3,528,701
BABY CARRIER
Original Filed May 29, 1967      5 Sheets-Sheet
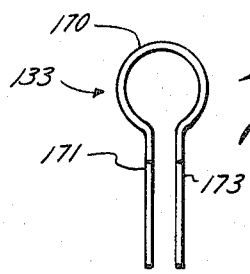
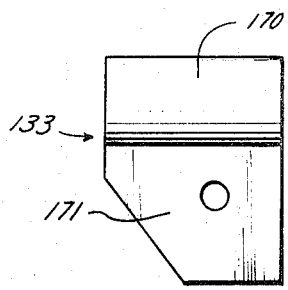
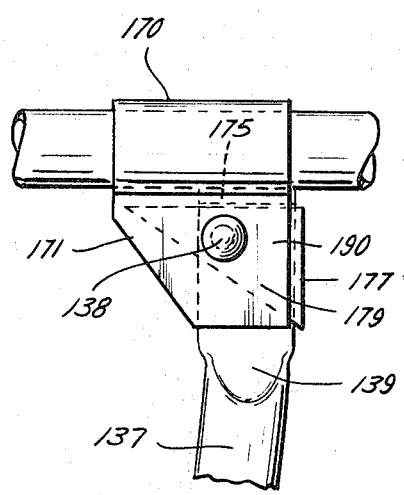
Clayton A. Laughlin
INVENTOR.
BY Murray Robinson
ATTORNEY

United States Patent Office 3,528,701
Patented Sept. 15, 1970

3,528,701
BABY CARRIER
Clayton Austin Laughlin, Minneapolis, Tex., assignor to Pyramid International, Inc., a corporation of Ohio
Continuation of application Ser. No. 641,802, May 29, 1967. This application Aug. 28, 1969, Ser. No. 857,618
Int. Cl. A47d 1/10
U.S. Cl. 297—253    16 Claims

ABSTRACT OF THE DISCLOSURE

A baby carrier comprises a generally rectangular frame made of steel tubing to which is connected a shell including hingedly connected back, seat, side, and top sections. The shell includes inner and outer sheets of vinyl plastic with padding therebetween. The back and seat sections and portions of the side sections also include stiffening panels adjacent and behind the padding. The back section includes a flexible pocket of sheet vinyl plastic into which is inserted a rigid panel or hardboard. The front edges of the side sections are secured to the frame by loops through which passes the tubing of the frame. The front edge of the seat section is connected to the frame by a bar extending transversely of the frame through the front edge of the seat section into holes in the frame. The sides of the rectangular frame are shaped to accommodate a deeper shell portion adjacent the seat section, with arm rests at the juncture of the deeper portion with the shallower upper portion of the shell. The frame is further shaped so that the bottom portion thereof forms a front support for the carrier when it is rested on horizontal surface. An adjustable prop or back support for the carrier includes a tubular steel member of generally U shape having metal straps at its ends encircling and sliding axially along the sides of the upper portion of the rectangular frame of the baby carrier. These straps are connected to the ends of the U-shaped prop by locking pivot means such that when the U-shaped member lies parallel to the back of the carrier with the bight of the U-shaped member at the bottom of the carrier the straps can be easily slid along the tubular frame to any desired position but when the prop is moved out to a position transverse to the back of the carrier the straps can slide only with difficulty and cant into frictional locking engagement with the frame when the carrier is loaded so as to tend to turn the prop so that the bight would be against the top of the carrier. The bight portion of the prop is provided with tubular feet and the sides of the prop are angled so that when the carrier is disposed on a car seat the bight portion can be slipped between the back and seat cushions of the auto, the tubular feet locking the prop to the car seat. The carrier is provided with belt and crotch straps secured to the frame and transverse bar. A padded tubular steel restraining wicket, is releasably engaged with the frame by pins snapping into holes in the frame. A feeding tray is releasably connected to the frame by bars entering holes in the frame and extending axially therein. A removable sun shade is similarly connected to the frame by bars entering holes higher up on the frame and extending axially therein.

This application is a continuation of application Ser. No. 641,802, filed May 29, 1967, now abandoned.

BACKGROUND OF THE INVENTION

The invention pertains to baby carriers. Prior art baby carriers are exemplified by U.S. Pat. No. 2,324,421 to Ouellette wherein is disclosed a baby carrier made of rigid material such as wood. More recently such carriers have been molded of plastics material. Difficulty is experienced with such constructions due to the low strength of the material and the high stresses imposed thereon at points of juncture of the body of the carrier with accessory items such as props, feeding trays, sun shades, car seat hooks, and other accoutrements. The points of attachment of the accessory items to the body are subject to failure. Another type of construction is disclosed in said Ouellette patent including a frame of branched tube or bar stock over which are stretched two fabric slip covers. There is difficulty in making the welded joints of the branched frame; also the slip covers do not provide firm back support for the baby; and the slip covers fully enclose the frame making attachment of accessories difficult. The prior art, including the aforementioned Ouellette patent also teaches that a prop may be connected to the back of the baby carrier to support it in a more or less upright position when rested upon a horizontal surface. The prop shown in the Ouellette patent is pivotally connected to the carrier and may be placed at any angle to the back of the carrier and clamped in such position with thumb screws. This arrangement is subject to possible collapse if the thumb screws are not properly tightened. An alternative prop shown in Pat. 3,101,972—Laughlin provides for positive locking of the prop in any of a selected number of positions. The latter arrangement is somewhat cumbersome to set up and is limited in the number of adjustment angles permitted.

BRIEF DESCRIPTION OF THE DRAWINGS

FIG. 1 is a perspective view of a baby carrier embodying the invention;
FIG. 2 is a fragmentary front view of the baby carrier of FIG. 1;
FIG. 3 is a side view of the baby carrier of FIG. 1;
FIG. 4 is a view similar to FIG. 1 showing a feeding tray added to the baby carrier;
FIG. 5 is a perspective view of a sunshade which may be added to the baby carrier;
FIG. 6 is a view similar to FIG. 1 showing a further restraining means added to the baby carrier;
FIG. 7 is a section taken at plane 7—7 of FIG. 1;
FIG. 8 is a plan view of the prop for the baby carrier shown in FIG. 1;
FIG. 9 is a view partly in section and partly in elevation showing the prop of FIG. 1;
FIG. 10 is a fragmentary perspective of the interior of an automobile showing the manner of use therein of the baby carrier of FIG. 1;
FIG. 11 is a perspective of the FIG. 1 baby carrier showing a further use thereof;
FIG. 12 is an end view of a slide means forming part of the FIG. 1 baby carrier;
FIG. 13 is a side view of the slide means; and
FIG. 14 is a side view of the slide means together with adjacent pivot and locking means joining the prop to the frame of the FIG. 1 baby carrier.

SUMMARY OF THE INVENTION

According to the invention the difficulties of the aforementioned prior art constructions for baby carriers, both as to the bodies thereof and adjustable props therefor, are overcome by providing an unbranched tubular metal frame to which is secured a shell comprising hingedly connected sections formed by inner and outer flexible sheets with padding therebetween and rigid back, seat, and side panels adjacent the padding to the outside thereof, the shell being peripherally secured to the frame by loops or hems through which passes the tubing, the front edge of the seat section of the shell being connected to the frame by a transverse bar passing through a hem in the shell and entering holes in the frame. The hems and loops joining the shell to the frame are disposed at the lower and upper parts of the frame only, leaving the central portion of the sides of the frame exposed. Slidably disposed on the exposed side sections of the frame are tube-like straps connetced to the ends of a tubular U-shaped prop whereby the latter can be positioned at any position along the medial portion of the frame. Locking pivot means connetcs the prop to the straps to allow free sliding of the straps when the prop is folded back with the bight of the prop at the bottom of the carrier and to resist such sliding when the prop is extended transverse to the back of the carrier and loaded. Although the angle of the prop relative to the back of the baby carrier is always the same when the prop is locked in its extended position tarnsverse to the back of the baby carrier, the back of the baby carrier will have different inclinations relative to the horizontal, depending upon the position of the straps along the medial portion of the frame. Accessories, such as a feeding tray and sun-shade may be provided with bars insertable axially into the tubular frame through holes therein to rigidly position same. A restraining bar is provided with pivot pins transverse to the tube axis of the frame disposed in holes in the sides thereof.

DESCRIPTION OF PREFERRED EMBODIMENTS

Referring now to FIG. 1 there is shown a baby carrier including a steel frame 11 and a shell 12 peripherally connected to the frame. The fframe 11 is a lineal element, preferably tubular, and preferably is a continuous loop of generally rectangular shape. The frame is preferably made of two tubular sections 13, 14, (see also FIGS. 2 and 3) of the identical shape except opposite handled. The upper end 15 of one section, e.g. 13, is reduced in outer diameter to fit tightly, telescopically inside the upper end of the other. The lower end of the other section is similarly reduced in outer diameter to fit tightly telescopically inside the lower end of the one member. A sleeve 17 of resilient plastics material, e.g. polyvinyl chloride, is slipped over the joint between members 13 and 14 at the lower end of the frame, making a tight frictional fit therewith. A similar sleeve 18 is slipped over the joint between members 13 and 14 at the upper end of the frame. Larger, axially serrated, sleeves or spools 21, 23 slipped with a tight friction fit over the lower ends of members 13, 14, provide non-skid feet for the baby carrier.

The frame 11 is forwardly displaced at 25, 27 to accommodate the deeper lower portion of shell 12, thereby forming bends or angles in the frame. Apertures 29, 31 are provided at the angles located at the upper ends of the forwardly displaced portion. A feeding tray 35 (see FIG. 4) is provided at each side with a rearwardly projecting resilient steel bar such as that shown at 37, which extends downwardly rearwardly to the apertures 29, 31 and then downwardly forwardly within the forwardly displaced portions 25, 27 of the tubular frame, e.g. as shown in dotted lines at 39 in FIG. 4. The lineal members or bars 37 are easily released from the frame but due to the length of their engagement with the frame are not likely to be accidently released. The length of the engagement also insures a firm connection even though the bars 37 having an outer diameter sufficiently smaller than the inner diameter of the tubular frame to allow easy insertion and withdrawal.

FIG. 4 illustrates a silght modification of the frame wherein the members 13 and 14 are integral at the lower portion 41 of the frame. The upper ends of members 13 and 14 are welded together and the juncture is covered by a hem 43 in the head section 45 of the shell.

Referring again particularly to FIGS. 1–3, apertures 47 and 49 in the upper parts of the frame members 13 and 14 at the angles where the frame members turn inwardly, are provided to releasably, telescopically receive the attachment bars 51, 53 (see FIG. 5) of a sun shade 55.

FIG. 6 shows the baby carrier of FIG. 4 with a restraining bar 57 releasably and pivotally connected thereto. The restraining bar includes a U-shaped tubular member 59 having flattened end portions 61. Pivot pins 63 extend through the end portions into apertures in the sides of the frame such as those shown at 65, 67. The restraining bar is resilient so that it can be forced apart manually sufficiently to position pins 63 in apertures 65, 67, and has enough strength so that they do not accidentally come out. The pivotal connection of the bar allows it to be arised and thrown over the back of the carrier, as indicated by the dotted line 67 in FIG. 6, where it is out of the way. With a baby positioned in the carrier the bar can be rotated back to the position shown in FIG. 6 and anchored in position by securing crotch strap 69 therearound with snap fastener 71.

As shown in the broken away section in FIG. 6, the steel tube 59 is covered with a composite tube 75 including an outer layer 77 of sheet vinyl plastic and an inner layer of padding such as a synthetic fibre felt or batting.

When the restraining bar is removed, a belt 81 (see FIG. 7) may be employed to retain the baby in the carrier. In such case the crotch strap 69 is fastened to the belt 81. The belt is provided with looped ends 83 which go around the tubular frame 11. The crotch strap is stapled at 85 (see FIG. 1) to the front edge of the seat section 87 (see FIG. 6) of the shell 12.

As best shown in FIGS. 2 and 4 a bar 89 extends transversely of frame 11 through the front edge of seat section 87 into apertures 91, 93 at the lower part of the forwardly displaced portion 25, 27 of frame 11.

Referring again to FIG. 6 the back section 45 of the shell 12 is flexibly connected at its lower end 97 to the back edge of the seat section 27. The side edges of the back section are flexibly connected to the back edges of lower side sections 99, 101, medial side sections 103, 105, upper side sections 107, 109, and at its upper edge to head section 111 of shell 12. The lower side sections are provided with loops or hems 113, 115 passing around the arm rest portions 117, 119 of frame 11. The peripheries of the medial side sections 103, 105 are unconnected to the frame 11. The upper side sections 107, 109 are mere loops passed around the tubular frame. The outer periphery of head section 111 is unconnected to the frame, leaving sleeve 18 free to serve as a handle, as does sleeve 17 at the lower end of the frame.

All of the sections of the shell include inner and outer (or front and back) sheets of vinyl plastic, heat sealed together at the edges. The head section 111 and lower side sections 99, 101 include a suitable padding between the sheets. The medial side sections 103, 105 and the back section 95 and the seat section 87 each further include a rigid panel on the outside of the padding. FIG. 7 is a section through side panel 105, which is also typical of the padded, paneled seat and back sections, and shows inner and outer vinyl sheets 121, 123, hardboard or plastic panel 125, and padding 127. The panel 125 is resin impregnated so that it is unitized with the padding 127 and vinyl sheets 121, 123, when welded thereto by dielectric heating. Such lines of welding are shown at 129 in the lower part of the back section and in the side sections, dividing the padding up into pads.

The medial portions 130, 131 (see also FIG. 4) of the sides of frame 12 are left uncovered by virtue of the medial side sections 103, 105 of the shell being unconnected thereto. Metal straps 133, 135 (see also FIG. 3) encircling the tubular frame are therefore free to slide up and down the medial portion of the frame. A U-shaped, tubular steel prop 137 (see also FIGS. 8 and 9) has flattened end portions 139, 141 pivotally connected to straps 133, 135, by rivets 138, 140. The bight portion 141 of the U-shaped prop has resilient polyvinyl chloride, axially serrated spools or sleeves 143, 145 slipped thereof in tight frictional engagement with the prop. Spools 143, 145 provide skid resisting feet for the back support of the carrier, the spools 21, 23 similarly providing antiskid feet for the front support of the carrier.

The prop 137 together with straps 133, 135 can be moved up and down the back of the baby carrier as shown in FIGS. 1 and 3 to position the back of the carrier at different inclination to the horizontal. Releasable clamping means, described hereinafter, prevents the straps from moving along the frame accidentally.

As shown in FIGS. 9 and 10 the bight portion of the prop is rearwardly displaced forming an angle at 147. The bight portion of the prop is therefore adapted to be slipped between the back and bottom seat cushions 151, 153 of an automobile when the carrier is rested on the front seat thereof. The feet 143, 145 squeeze through the juncture 155 of the seat cushions and are thus locked in the space therebehind, releasably anchoring the baby carrier to the front seat.

When the prop 137 is not needed, as when the carrier is being used to carry the baby in the user's arms, the prop is folded down against the back of the carrier as shown in FIG. 11. With the prop straps slid all the way down the medial portion of frame 11, the bight 141 of the prop fits into the space between the bottom of seat section 87 and the sleeve 17 at the bottom of the frame, the feet 143, 145 slipping past feet 21, 23 and releasably locking therebehind.

Referring now to FIGS. 12, 13, 14, there is shown the details of the connection between the prop 137 and the frame 11. There is shown a strap 133 having a tubular portion 170 adapted to encircle the tubular frame and wings 171, 173 adapted to engage the sides of flattened end 139 of the prop. The prop is provided with a smooth, slightly slippery, resilient pad 175 protruding from its flattened end. The pad may be made of Teflon. The pad fits between the wings 171, 173, to engage the tubular frame. A snubber plate 177 has triangular gussets 179 disposed on opposite sides of the flattened end 139 of the prop, the gussets 179 lying inside wings 171, 173. The rivet 138 extends through wings 171, 173, gussets 179, and end 139.

When prop 137 is torqued to move counterclockwise, as viewed in FIG. 14, the pad 175 bears against frame 11 and cams rivet 138 away from the frame, thereby drawing the tubular portion 170 of the strap into binding engagement with the frame. There is thus formed a releasable clamping means to prevent relative sliding of the strap along the frame.

The part of the prop end 139 around the rivet 138 nearest the frame 11 provides an angle ended detent 190 fitting in the socket formed between plate 177 and the frame. This detent and socket provide semilocking means holding the prop in extended position as shown in FIG. 14. However there is enough resiliency to the parts so that by exertion of moderate torque the prop can be turned to position pad 175 against plate 177, which is the position of the parts when the prop is retracted as shown in FIG. 11.

Although specific materials such as steel, vinyl, hard board, polyvinyl chloride, and Teflon have been mentioned, these are to be considered merely illustrative, since other materials can be used.

While preferred embodiments of the invention have been shown and described, many modifications thereof can be made by one skilled in the art without departing from the spirit of the invention.

I claim:
1. A baby carrier comprising
 a rigid lineal frame and
 a shell peripherally connected to said frame,
 said shell comprising flexible sheet material and in addition said shell also comprising rigid back and seat panels,
 each of said rigid panels being of less extent than said shell,
 said flexible sheet material being generally coextensive with said shell,
 said flexible sheet material being laminated with and overlying said rigid panels in mutually supporting relationship, i.e. said rigid panels support said flexible sheet material to provide rigid back and seat portions of said shell and said flexible sheet material supports said panels to connect them to said frame.

2. A baby carrier comprising a rigid frame,
 a shell peripherally connected to said frame, said shell comprising flexible sheet material and rigid back and seat panels,
 each of said rigid panels being of less extent than said shell,
 said flexible sheet material being associated with said rigid panels in mutually supporting relationship, i.e. said rigid panels support said flexible sheet material to provide rigid back and seat portions of said shell and said flexible sheet material supports said panels to connect them to said frame,
 said shell being unconnected to said frame at medial portions of the sides thereof, and
 means for supporting the carrier at desired fixed angles to a floor, including
 a prop having end portions adjacent said medial portions of the frame,
 slide means encompassing and slidable longitudinally along said medial portions of the frame and pivotally connected to said end portions of the prop, and
 releasable clamping means for holding said slide means in desired position along said medial portions of the frame.

3. Combination of claim 2 wherein said slide means is connected to said portions of the prop by:
 pivot means allowing the prop to move between a retracted position generally parallel to the back of the baby carrier and an extended position transverse to the back of the baby carrier, and including
 semi-locking means at the juncture of said end portion and frame holding said prop in the selected one of said positions.

4. Combination of claim 3 wherein said semi-locking means comprises an angular socket and an angular detent, said angular detent including a resilient portion deformable to allow rotation of said detent in said socket.

5. Combination of claim 3 wherein said clamping means is responsible to torque tending to move said prop beyond said extended position to bind said slide means to prevent motion thereof along said frame.

6. Combination of claim 5 wherein said clamping means comprises detents on the ends of said prop engaging said frame upon motion of said prop beyond said extended position to move the pivot axes of said prop ends away from said tube and draw said slide means against said frame.

7. Combination of claim 1 wherein said shell comprises inner and outer sheets of flexible material, said rigid panels being disposed in pockets formed between said sheets by connection of said sheets around the periphery of each panel.

8. Combination of claim 7 including padding disposed upon each of said back and seat panels on the insides thereof.

9. Combination of claim 1 including rigid side panels associated with said flexible sheet material and forming with adjacent sheet material the side portions of the shell, the flexible sheet material hingedly connecting said side portions to said back portion of the shell, the periphery of said shell formed by said side panels being unconnected to said frame but extending forwardly therebeyond within the inner periphery of said frame.

10. Combination of claim 1 wherein said shell includes a padded head section, the rear edge of said head section being hingedly connected to the upper part of said back portion by said flexible sheet material, the portion of the periphery of said shell formed by said padded head section being unconnected to said frame but extending forwardly therebeyond within the periphery of said frame.

11. Combination of claim 1 wherein said frame is a continuously tubular member forming a closed loop.

12. Combination of claim 11 wherein said frame is composed of two tubular sections telescopically joined end to end.

13. Combination of claim 12 including plastic sleeves over the outside of the telescopic joints, said sleeves being in tight frictional engagement with the tubular frame.

14. Combination of claim 1 wherein said shell comprises inner and outer panels of sheet plastic heat united along a plurality of lines forming pockets receiving said back and seat panels and forming peripheral hems slipped over said frame, and forming additional pockets at the sides and head of the shell, the head pocket being padded, upper side pockets containing padding, all of said panels being interiorly padded.

15. Combination of claim 1 wherein the shell comprises inner and outer sheets of flexible plastic between which said rigid panels are disposed, said sheets being sealed together around the periphery of each panel, said panels being padded on the inside, at least one of said panels being united with said sheets along lines extending over the surface of the panel dividing the padding into sections.

16. A baby carrier comprising:

a self-supporting rigid lineal frame of a continuous closed loop configuration including a lower end portion of U-shaped configuration, lower front portions extending upwardly from said end portion at each side thereof, armrest portions extending rearwardly from said front portion at the upper ends thereof, side portions extending upwardly from said armrest portions at the rear ends thereof, and a head portion connecting said side portions, said carrier further comprising a cross bar connected at its ends to said frame at the junctions of said armrest portions of said lower front portions, a shell formed of inner and outer flexible sheets, said shell including back and bottom portions, a rigid panel between the inner and outer sheets of each of said back and bottom portion of the shell; said flexible sheets forming a hinge connection between the bottom edge of said back portion of the shell and the back edge of said bottom portion of the shell, said shell further including lower side portions, each lower side portion of the shell being connected at its rear edge to a side edge of said back portion of the shell, hems at the sides of the upper part of the back portion of the shell encompassing said side portions of the frame, and hems at the forward upper edges of said lower side portions of said shell encompassing said armrest portions of said frame, the forward edge of said bottom portion of said shell being connected to said cross bar.

said shell further including padded upper side portions and a padded head portion, said upper side portion and said head portion of the shell being hingedly connected to said back portion of the shell, said upper side portion and head portion of the shell projecting forwardly through the inner periphery of said frame with their outer surfaces adjacent said frame but unconnected thereto.

References Cited

UNITED STATES PATENTS

| 1,049,080 | 12/1912 | Greene | 297—256 |
| 2,347,754 | 5/1944 | Shay | 297—253 |
| 2,508,822 | 5/1950 | Goldberg | 297—390 X |
| 2,764,228 | 9/1956 | Donohue | 297—445 |
| 2,782,839 | 2/1957 | Cole | 297—219 |
| 2,824,602 | 2/1958 | Collins et al. | 297—445 |
| 2,984,281 | 5/1961 | Kostenberger et al. | 297—153 |
| 3,101,972 | 8/1963 | Laughlin | 297—377 |
| 3,115,364 | 12/1963 | Berlin | 297—254 |
| 3,243,229 | 3/1966 | Barnhill | 297—253 |
| 3,245,717 | 4/1966 | Levy | 297—254 |

FOREIGN PATENTS 969,686  9/1964  Great Britain.

JAMES T. McCALL, Primary Examiner

U.S. Cl. X.R.

297—377

PO-1050
(5/69)

UNITED STATES PATENT OFFICE
CERTIFICATE OF CORRECTION

Patent No. 3,528,701　　　　　　　　Dated September 15, 1970

Inventor(s) Clayton Austin Laughlin

It is certified that error appears in the above-identified patent and that said Letters Patent are hereby corrected as shown below:

Col. 1, line 3, change "Tex." to -Minn-.

SIGNED AND
SEALED
MAR 2 1971

(SEAL)
Attest:

Edward M. Fletcher, Jr.
Attesting Officer

WILLIAM E. SCHUYLER, JR.
Commissioner of Patents